United States Patent
Poppen et al.

[11] Patent Number: 5,978,730
[45] Date of Patent: Nov. 2, 1999

[54] CACHING FOR PATHFINDING COMPUTATION

[75] Inventors: Richard Frederick Poppen, San Jose; Rodney Jude Fernandez, Fremont; James Laurence Buxton, Redwood City, all of Calif.

[73] Assignees: Sony Corporation, Tokyo, Japan; Etak, Inc., Menlo Park, Calif.

[21] Appl. No.: 08/802,733

[22] Filed: Feb. 20, 1997

[51] Int. Cl.$^6$ ........................................... G06F 17/00

[52] U.S. Cl. .................... 701/202; 364/400; 370/351; 701/201

[58] Field of Search ..................... 340/988, 989, 340/990, 995; 364/400; 370/351; 701/201, 202, 203, 209

[56] References Cited

U.S. PATENT DOCUMENTS

| | | | |
|---|---|---|---|
| 4,873,513 | 10/1989 | Soults et al. | 340/990 X |
| 4,984,168 | 1/1991 | Neukrichner et al. | 701/201 |
| 5,031,093 | 7/1991 | Hasegawa | 395/200.71 |
| 5,031,104 | 7/1991 | Ikeda et al. | 701/209 |
| 5,170,353 | 12/1992 | Verstraete | 701/202 |
| 5,276,768 | 1/1994 | Bander | 395/10 |
| 5,285,391 | 2/1994 | Smith, Jr. et al. | 701/200 |
| 5,369,588 | 11/1994 | Hayami et al. | 701/209 |
| 5,452,294 | 9/1995 | Natarajan | 370/351 |
| 5,495,479 | 2/1996 | Galaand et al. | 370/404 |
| 5,508,930 | 4/1996 | Smith, Jr. | 701/201 |
| 5,521,910 | 5/1996 | Matthews | 370/256 |
| 5,523,950 | 6/1996 | Peterson | 701/117 |
| 5,600,638 | 2/1997 | Bertin et al. | 370/351 |
| 5,712,788 | 1/1998 | Liaw et al. | 701/209 |
| 5,729,458 | 3/1998 | Poppen | 364/400 |
| 5,742,922 | 4/1998 | Kim | 701/201 |
| 5,754,543 | 5/1998 | Seid | 370/351 |

*Primary Examiner*—Edward R. Cosimano
*Attorney, Agent, or Firm*—Fliesler, Dubb, Meyer & Lovejoy LLP

[57] ABSTRACT

A system for computing a path in an electronic map (or other network) starts a pathfinding exploration in the background while the system is waiting for a request to find a path. The system automatically chooses an origin. The system's memory can be divided such that a portion of memory acts as a cache. The data for the nodes in the electronic map are loaded into the cache when needed. The system terminates the pathfinding process when a predetermined condition occurs; for example, a predetermined percentage of the cache is filled. When the system terminates the pathfinding process, the system can start a new pathfinding process from a new origin. Thus, when a user requests a path to be found, the pathfinding process begins with data already loaded in the cache.

34 Claims, 5 Drawing Sheets

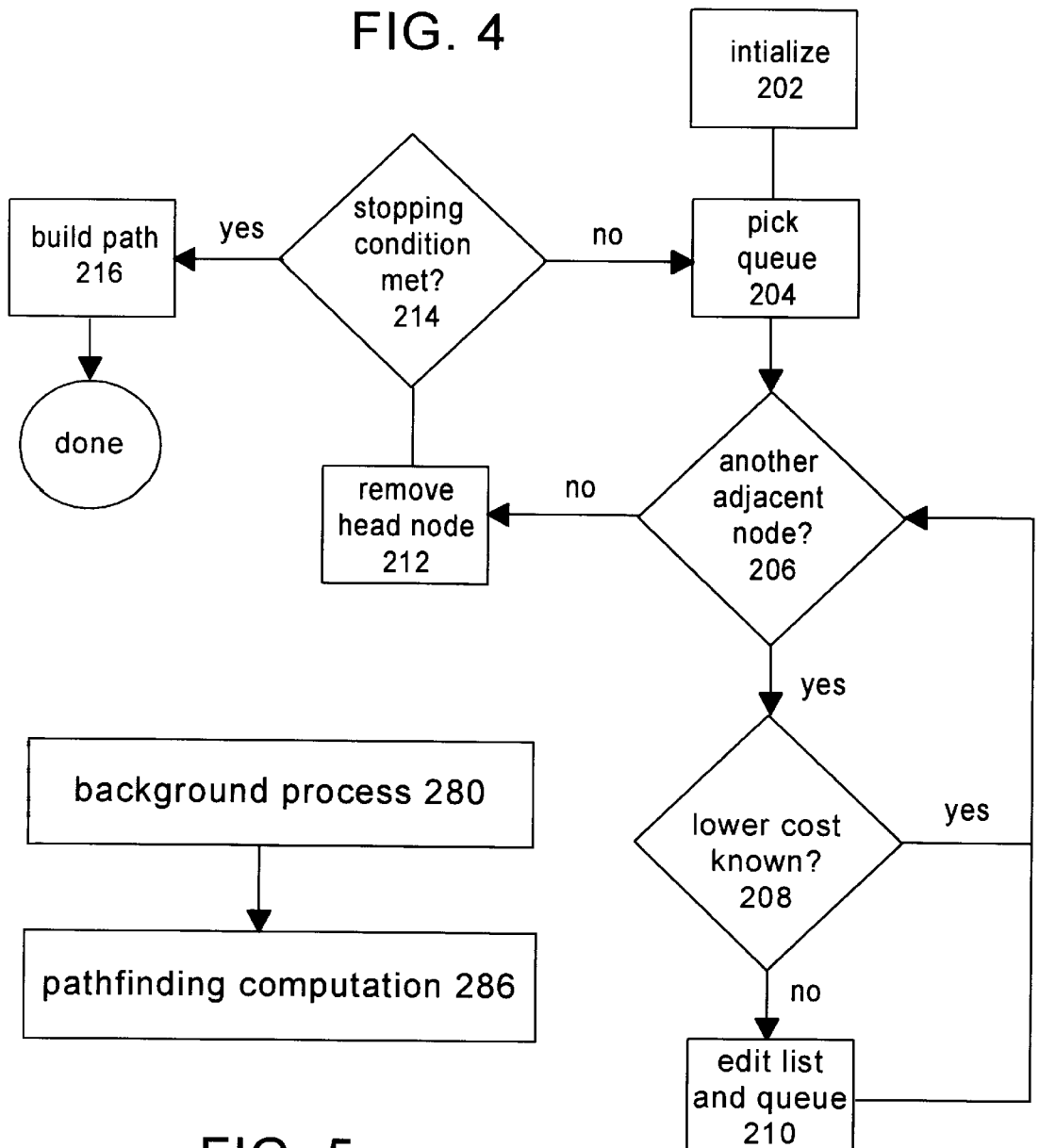

CACHING FOR PATHFINDING COMPUTATION

BACKGROUND OF THE INVENTION

1. Field of the Invention

The present invention is directed to a system for caching data for a pathfinding computation.

2. Description of the Related Art

The computer has revolutionized the idea of a map from an image statically depicting the location of physical features to the electronic map, which consists of geographically referenced electronic data quantifying a physical, social or economic system. The range of information included in electronic maps is unlimited; for example, electronic maps could include distances between elements, driving time, lot numbers, tax information, tourist information, etc. Additionally, storing a map as a file on a computer allows for unlimited software applications to manipulate that data.

One advantage of the electronic map is to store and determine costs associated with various portions of a map. Examples of cost include time, distance, tolls paid, ease of turning, quality of scenery, etc. Thus, a traveler may wish to know how far that traveler can drive without paying more than $10 in tolls, what restaurants are within a 10 minute drive, or what gas stations are within a one mile walk. In each of these situations, the traveler desires to know where they can travel to within a given cost. A more detailed discussion of costs can be found in U.S. patent application Ser. No. 08/756,263, Using Multiple Levels Of Costs For A Pathfinding Computation, filed Nov. 25, 1996, ETAK7717, U.S. No. Ser. 08/756,263, Richard F. Poppen, incorporated herein by reference.

Electronic maps can also be used for pathfinding, which is a method for computing a route between an origin and a destination. An electronic map that is used for pathfinding must carry information about the connectivity of a road network, that is, information about the ways in which pieces of road do or do not connect to each other, for example, where there are ordinary intersections, where there are overpasses, where turns are restricted, and so on. For an area of any significant extent, this is a very large amount of information. An electronic map can include tens or hundreds of megabytes of data. In order to hold such vast quantities of data economically and allow a user to replace maps with updated copies easily, many current pathfinding apparatus (which includes general purpose computers with pathfinding software, automotive navigation systems or other map application equipment) use CD-ROMs to store the electronic map data.

Although CD-ROMs hold a great deal of data, accessing that data can be relatively slow. For example, a typical CD-ROM drive used for automotive pathfinding may take on the order of ⅓ of a second for each read access. If a pathfinding system had to wait ⅓ of a second every time it needed data, the time needed to compute a path would not be acceptable to a user. A user of a navigational pathfinding system stored in a car typically would demand very fast response times when requesting a path because a user currently driving in the car needs to know which way to turn. For these reasons, it is very important to minimize the number of disk accesses required to compute a path. It is noted that some systems may use peripheral devices other than CD-ROMs, for example, hard disks, floppy disks, solid state memory, etc. These other storage devices suffer similar access time limitations.

One attempt to minimize the number of disk accesses required to compute a path includes grouping map data into clusters, that is, grouping together on a CD-ROM (or other storage device) information about sets of road segments often used in the same path computation. For example, a number of consecutive segments of the same street, road segments that cross each other or road segments that lead to a highway may be stored in a single cluster. Note that these clusters need not be geographically based. Information about roads on two sides of a river in an area that is not close to a bridge would probably not be stored in the same cluster, since the roads would not be used in relation to each other during path calculation even though they may be quite close to each other geographically. Information about highways over a wide area are good candidates to be stored together in one cluster because a path computation typically explores the connections of highways with other highways. There are many ways to cluster data to increase performance. One example of clustering data can be found in U.S. patent application Ser. No. 08/245,690, Method for Clustering Multi-Dimensional Data, filed May 18, 1994, Poppen et al., now U.S. Pat. No. 5,706,503, incorporated herein by reference. When clustering is used with a suitable cache methodology, the time for pathfinding is saved because information needed by the pathfinding computation is often already in the cache (or main memory) having been read as part of a cluster which includes data already used.

Caching is a well-known process of saving records recently read in order to reduce the number of disk/memory accesses. One of the most well known forms of caching includes using a small memory local to a processor called a cache memory. Certain data recently used is typically stored in the cache memory, with access to the cache memory being quicker than access to main memory. In this example, the cache memory caches data between main memory and a processor.

Another example of caching is to cache data between a storage device and main memory. An alternative to using a cache memory separate from main memory is to use a portion of main memory as the cache memory. When data is read from the storage device it is typically kept in the cache memory portion (hereinafter called "cache") of the main memory for a certain amount of time so that later access to that data will be quicker than accessing the storage device. The portion of the memory allocated as the cache will hold a number of records of data along with an indication of how recently each record has been used. When the program needs to read a given record, the program first looks in the cache for the record. If the record is in the cache, the program uses the information stored in the cache rather than reading the disk file again. If the record is not in the cache, and there is enough unused space in the cache to hold the record, the record is read into the cache and then used by the program. If the record is not in the cache and there is not enough unused space in the cache to hold the record, the least recently used record or records are discarded to provide sufficient room to hold the new record. A record of data could include one or more clusters of data or another suitable arrangement of data. If map data is clustered in such a way that information regarding a given road segment is often used shortly after the use of information regarding another road segment in the same cluster there will be a significant speed improvement in the pathfinding process because the number of accesses to the CD-ROM will be decreased.

The path calculation remains a lengthy process even when using a cache as described above. Every cluster used in the computation still needs to be read at least once. Since the pathfinding computation may need to read a large number of clusters at the beginning of the pathfinding computation, the user of the pathfinding apparatus still spends a significant amount of time waiting for the pathfinding apparatus to read all the data prior to a path being calculated.

Therefore, a system is needed that reduces the amount of time needed to calculate a path from an electronic map.

SUMMARY OF THE INVENTION

The present invention, roughly described, provides for a system for computing a path in a processor readable representation of a network that caches data to be used in a pathfinding process. In one embodiment, the system chooses, automatically, an origin in a processor readable representation of a network without the pathfinding computation being requested. A preliminary pathfinding exploration is commenced and sets (or records) of data are loaded, as needed, into a processor readable storage medium. The pathfinding exploration is terminated when a predefined condition is met. When a user requests a path to be found, the pathfinding computation proceeds with the use of the processor readable storage medium as it has been filled by the preliminary pathfinding exploration. Since the processor readable storage medium is already filled with some data, the system saves the time of loading the medium, thus reducing the processing time for the pathfinding computation.

The origin chosen by the system could be the current position of a vehicle in an electronic map, the position of the vehicle at a time in the future, a distance from the current position of the vehicle, or other area of interest. In one embodiment, the processor readable storage medium is a memory (e.g. RAM) and a portion of the memory is reserved for use as a cache memory.

There are various alternative predefined conditions for terminating the pathfinding computation. For example, the pathfinding computation can be terminated when a predetermined number of nodes have been processed, a predetermined number of sets of data have been loaded into the cache, the cache is filled to a predetermined percentage, a predetermined amount of time has elapsed or any other suitable condition for stopping. In one embodiment, after the predefined condition has been met, the system continues a second exploration which only utilizes data that has been previously loaded into the cache memory. This second pathfinding calculation effects which data is marked as recently used.

In one embodiment, after the pathfinding calculation has terminated, the system chooses, automatically, a new origin in the network without the pathfinding computation being requested. A second pathfinding calculation is calculated about the new origin and new data is loaded into the computer readable storage medium. The second pathfinding calculation is terminated when a second predefined condition is met. The second predefined condition can be the same as the first predefined condition.

One embodiment for performing the present invention includes a processor, a memory and a processor readable storage medium. The processor is programmed to choose the origin in the electronic map, commence the pathfinding exploration, load sets of data and terminate the pathfinding calculation as described above.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 4 is a flow chart describing a method for computing a path.

FIG. 5 is a flow chart of the pathfinding process utilizing the current invention.

DETAILED DESCRIPTION

Figure 1:
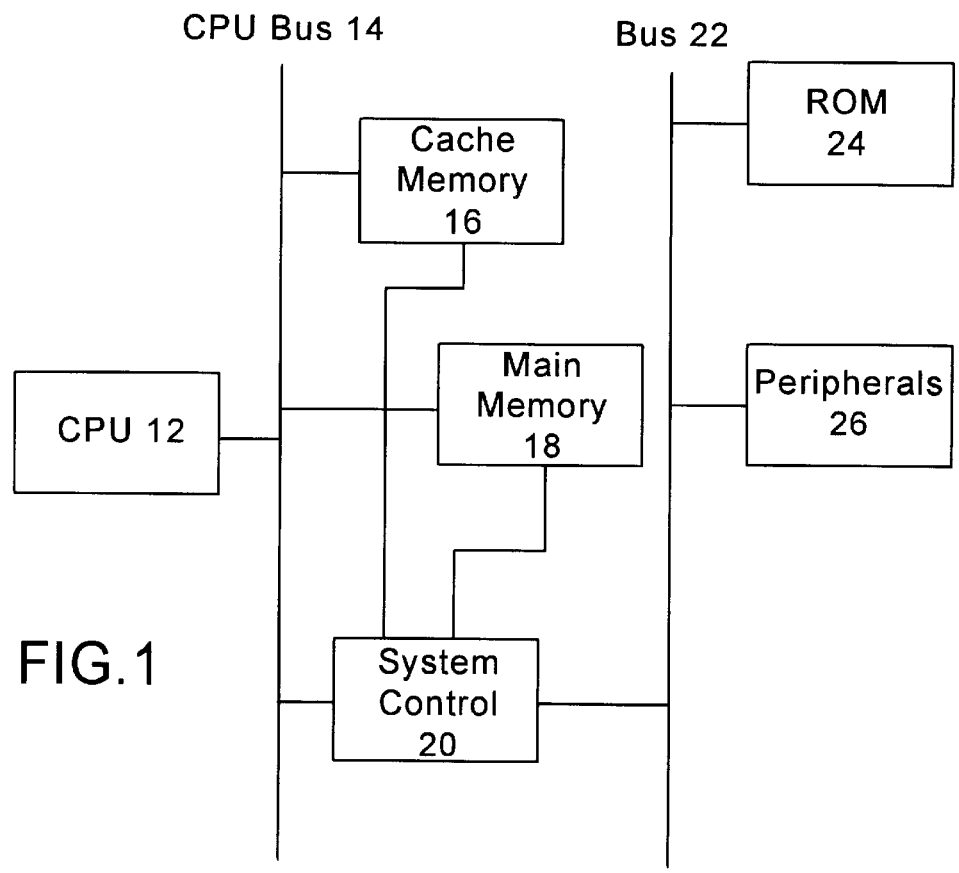
FIG. 1 is a block diagram of one exemplar hardware architecture that can be used to practice the present invention.

FIG. 1 is a symbolic block diagram of one exemplar hardware architecture that can be used to practice the present invention. The hardware includes CPU 12, which may be an Intel 80486 compatible CPU, Pentium Processor, or other suitable processor. CPU 12 has address, data and control lines which are connected to CPU bus 14. CPU bus 14 is also connected to a cache memory 16 and to main memory 18, both of which are controlled by system control logic 20. System control logic 20 is connected to CPU bus 14 and also to control, address and data lines of bus 22. Connected to bus 22 is ROM 24, which contains the system BIOS, and Peripherals 26, which can include a floppy, a hard-disk drive, CD-ROM drive or other peripheral device. Cache memory 16, DRAM memory 18, ROM 24, a CD-ROM and a floppy disk are all processor readable storage devices (or media). Various embodiments of the current invention use various amounts of software to perform the described methods. This software can reside on any suitable processor readable memory. Not depicted in FIG. 1, but included in the hardware, is a display and an input device such as a keyboard or pointing device. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

An electronic map is stored in one or more computer files which include the data necessary to construct a map. This data could include longitude and latitude data, addresses, distances, turning restrictions, driving times, highway exit numbers, descriptions of commercial uses of properties, etc. Although the above listed information can be found in an electronic map, it is possible to create an electronic map with only a subset of the above listed information or with other information. The computer files representing an electronic map are stored on a processor readable storage medium.

Generally, an electronic map to be used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links.

A weighted graph is a graph in which each link (or edge) has a cost associated with it. Alternatives includes associating the costs with the nodes, with the nodes and links, or associating costs with another element of the graph. An undirected graph is a graph where each link is bidirectional. An undirected graph can be thought of as a directed graph where each link represents two links with the same end points but different directions.

Figure 2A:
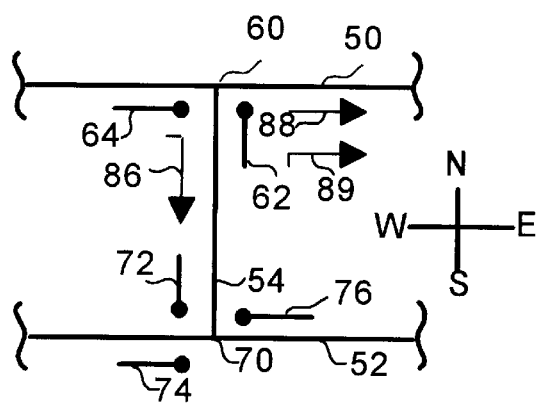
FIG. 2A is an example of a directed graph representing a part of an electronic map.

FIG. 2A shows an exemplar directed graph which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located and the tail represents where a traveler would come from to reach that node. The node symbol is displaced from the actual intersection for purposes of visibility. For example, node 62 represents travel northbound on street 54 toward intersection 60. Node 64 represents travel eastbound on road 50 toward intersection 60. There is no node at intersection 60 to represent westbound travel on street 50 because street 50 is an eastbound oneway street. Thus, a traveler proceeding north on road 54 and reaching intersection 60 can only make a right turn. Node 72 represents arriving at intersection 70 by traveling south on street 54. Node 74 represents arriving at intersection 70 by traveling east on road 52. Node 76 represents arriving at intersection 70 by traveling west on road 52.

Links represent a path between nodes. For example, from node 64 a traveler can make a right turn at intersection 60 to enter road 54 or can proceed straight on road 50. Link 86 represents travel starting from intersection 60 on road 50 facing east, making a right turn at intersection 60 and proceeding south on road 54. Thus, link 86 connects node 64 to node 72. Link 88 connects node 64 to the next node on street 50 (not shown on FIG. 2A) and represents travel east along road 50, proceeding straight through intersection 60 without turning. Link 89 represents travel starting from intersection 60 on road 54 facing north, making a right turn at intersection 60 and proceeding east on road 50; therefore, link 89 connects node 62 to the next node on street 50 (not shown on FIG. 2A). FIG. 2A only shows links drawn for nodes 62 and 64. If links are drawn for all nodes, the directed graph would become too crowded and would be difficult to read. Thus, the directed graph is simplified and redrawn as in FIG. 2B.

Figure 2B:
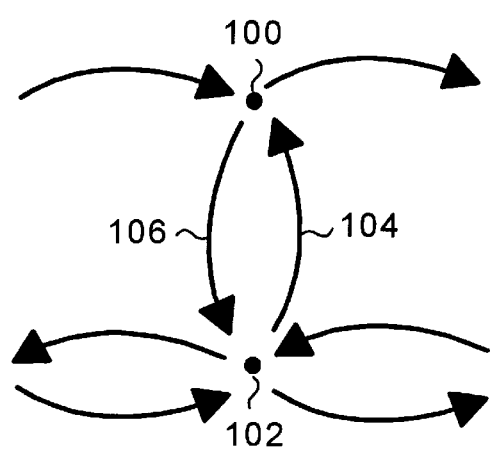
FIG. 2B is a second example of a directed graph representing a part of a network.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102, represents nodes 72, 74 and 76. Note that the tails of the nodes are not drawn. The links are used to indicate directions of allowable travel. Link 104 indicates travel from intersection 70 to intersection 60 and link 106 indicates travel from intersection 60 to intersection 70. Turn restrictions and one-way streets are represented by the presence or absence of a link.

The directed graph of FIG. 2B is used to symbolically understand the data structure stored in a processor readable storage medium. A processor readable storage medium does not actually store an image of a directed graph. Rather, a data structure is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, other networks, or any other suitable subset of information. Furthermore, one or more entries in a data structure can be grouped together in a cluster of data A cluster of data is a grouping of related data. Although clusters improve performance, the present invention can be used without clusters.

Figure 3:
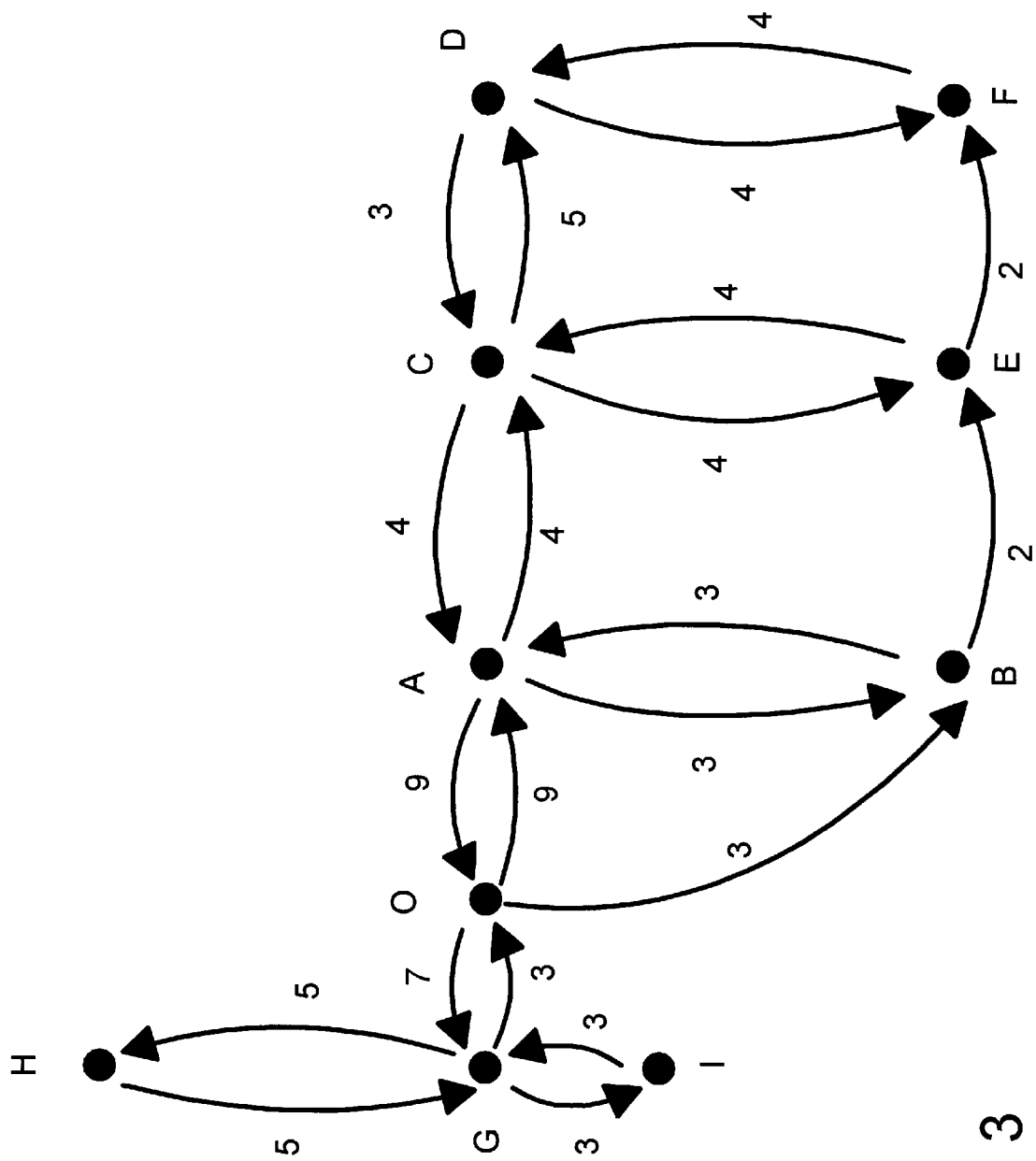
FIG. 3 is a directed graph representing a part of an electronic map used for exemplar purposes to describe the pathfinding process and caching process.

FIG. 3 represents the directed graph for a portion of an electronic map. The directed graph depicted includes ten nodes (A, B, C, D, E, F, G, H, I, and O) and various links between the nodes. Each of the links include a number adjacent to the link. This number represents the cost of traveling along that link. For exemplar purposes only, the cost is assumed to be driving time. To help explain the current invention it is assumed that a driver in a car has an automotive navigation system in the car that performs pathfinding. The driver is located somewhere in the directed graph of FIG. 3 and at some point may decide to ask the navigation system to compute a path from one location to another. To explain how a path is computed, it is assumed that the driver has asked the system to compute a path from the origin O to the destination D. At the time the driver asked for the path the driver may have been at origin O, may be at another location in the graph driving toward origin O, or may be nowhere near origin O but still interested in the path.

FIG. 4 is a flow chart which explains a pathfinding computation. The pathfinding computation of FIG. 6, which is based at least in part on the work of Edsger W. Dijkstra, is only one of many pathfinding methods that can be used with the present invention. One reference that discusses Dijkstra's method is M. N. S. Swamy and K. Thulasiraman, *Graphs, Networks, and Algorithms*, John Wiley & Sons (1981). In step 202 the system initializes the pathfinding computation. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the known lowest distance from the origin to the node plus an estimated cost of traveling from the node to the destination. There are various alternatives for estimating the cost for traveling from the node to the destination which are suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determiming a destination key. One alternative includes using the known lowest cost path from the node to the destination. An alternative key includes using the sum of the known cost from the node to the destination plus an estimated cost from the origin to the node. The key described above for the origin priority queue which utilizes the estimated remaining costs produces an exploration from the origin that is biased in the direction of the destination. Similarly, an exploration from the destination is biased in the direction of the origin. Other methods of computing a key are suitable within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialization step 202 is completed, the origin priority queue and the origin visited list include the origin, and the destination priority queue and the destination visited list include the destination.

Once the system is initialized, the system chooses a queue according to a rule in step 204. There are many rules of picking a queue which are suitable for the present invention. In one system, the queue containing the element with the smallest key is chosen, with ties broken arbitrarily. In another system, the queue containing the least amount of elements is chosen. Other examples of rules for choosing a queue include alternating between queues; choosing the origin queue for a certain number of iterations (or a time period), switching to the destination queue for a certain number of iterations, switching back to the origin queue for a certain number of iterations, etc. Since the queues are sorted by keys, the node with the smallest key will be at the head of the queue (also called the front or the top of the queue). This node is called the "head node." In the example discussed below, the method for picking a queue will be to alternate starting with the origin priority queue.

In step 206 the system looks for all nodes which are adjacent nodes to the head node of the chosen queue. Since the system has just started, the only node in the origin priority queue is the origin. The adjacent nodes are those nodes which can be traveled to from the origin without going through any other nodes. With respect to FIG. 3, the adjacent nodes for the origin O are nodes A, B and G. Since there are three adjacent nodes, the system arbitrarily picks one adjacent node. In step 208 the system determines whether there is a lower cost known on the visited list or the priority queue for the adjacent node picked. That is, the system determines the cost of traveling between the adjacent node and the head node and adds that cost to the cost already known for the head node. In this case, the adjacent node picked is node A, the cost of traveling from the origin to node A is 9. Since the pathfinding computation has just started, node A is not on the visited list or the origin priority queue so there is no known cost. Since there is no known cost, in step 210 the system edits the visited list and the priority queue to add node A and its cost. The method loops back to step 206 to determine whether any additional adjacent nodes have not been considered. In this case there are two adjacent nodes that have not been considered: B and G. In step 208, if there is a lower cost known, then the system loops to step 206.

In step 208 the system determines whether there is a lower cost known for node B. The cost for traveling from origin to B is 3 and B does not appear on the priority queue or the visited list. In step 210 node B is added to the priority queue and the visited list. The system loops back to step 206 and considers node G, since there is no known cost lower than the cost of going directly from the origin O to G, which is 7, G is added to the priority queue and the visited list. The system loops back to step 206 and determines that there are no adjacent nodes; therefore, in step 212 the head node, which is currently the origin, is removed from the priority queue. Table 1 reflects the contents of the origin priority queue and the visited list at this point in the pathfinding computation. There are three nodes on the origin priority queue: B, G and A. Their keys represent the cost of traveling from the origin to that node. The visited list has three columns: Node, Cost and Prev. The node column lists the node identification, the cost column lists the lowest known cost of traveling from the origin to that node and the Prev column lists the previous node along the path from the origin to the listed node when traveling along the path utilizing the lowest known cost. The order that the nodes are listed in the visited list can be any order that makes it easy to search the list. For example, the nodes can be listed in alphabetical order. In one implementation, the nodes are named by numerical codes and the visited list is a hash table.

TABLE 1

| Origin Priority Queue | | Origin Visited List | | |
|---|---|---|---|---|
| Node | Key | Node | Cost | Prev |
| B | 3 | A | 9 | O |
| G | 7 | B | 3 | O |
| A | 9 | G | 3 | O |
|  |  | O | 0 | — |

In step 214 the system determines whether a stopping condition has occurred. There are many stopping conditions which are suitable for the present invention, for example, stopping when a node has been the head node on both the origin priority queue and the destination priority queue. Another stopping condition, which is the stopping condition used in this example, is stopping when the cost of traveling from the origin to the head node in the origin priority queue plus the cost of traveling from the head node of the destination priority queue to the destination is greater than or equal to the total cost of the best connection node. A connection node is the node that appears on the destination visited list and the origin visited list. Total cost of a connection node is the cost from the origin to the connection node plus the cost from the connection node to the destination. The best connection node is the connection node with the lowest total cost. In the present case there is no connection nodes so the stopping condition fails and, in step 204, the system picks a queue.

As discussed above, the queue selection algorithm in the present example is alternating; therefore, the system picks the destination queue. In step 206 the system determines whether there are any nodes adjacent to the destination D. In the present example there are two adjacent nodes C and F. In step 208 the system looks at node C and determines whether there is a lower known cost. Since there is not, in step 210 the destination priority queue and visited list are edited to add node C and its cost. The method loops back to step 206 which determines that there is another adjacent node, node F. In step 208 the system determines that there is not a lower known cost known for F. In step 210 the destination priority queue and the destination visited list are edited to add node F. In step 206 the system determines there are no more adjacent nodes to node D and node D is removed from the destination priority queue in step 212. Table 2 reflects the state of the destination priority queue and visited list at this point in the method. The column labeled Next list the next node along the path from the listed node to the destination when traveling along the path utilizing the lowest cost known.

TABLE 2

| Dest. Priority Queue | | Dest. Visited List | | |
| --- | --- | --- | --- | --- |
| Node | Key | Node | Cost | Next |
| F | 4 | C | 5 | D |
| C | 5 | D | 0 | — |
|  |  | F | 4 | D |

Since there are no connection nodes, the stopping condition fails (step 214) and the system picks the origin priority queue (step 204). From Table 1, it can be seen that the head node on the origin priority queue is node B. The adjacent nodes to node B are nodes A and E. In step 208, there is not a lower known cost for node A. Although node A does appear on the visited list with a cost of 9, the cost of traveling from the origin to node A via node B is 6. That is, the cost of traveling from O to B is 3 and the cost of traveling from B to A is 3. Thus, the cost of traveling from O to B to A is 6 which is lower than the cost of traveling from O directly to A. Therefore, in step 210 the visited list and priority queue are edited so that the cost of traveling to node A is 6 and the previous node in the visited list for node A is B. That is, to get to A from O at a cost of 6 you must travel through node B. In step 206 the system determines that there is another adjacent node, E. In step 208 the system determines that there is not a lower known cost for E and the priority queue and visited list are edited to include E. Table 3 reflects the current state of the origin priority queue and the visited list after node B was removed from the priority queue (step 212).

TABLE 3

| Origin Priority Queue | | Origin Visited List | | |
| --- | --- | --- | --- | --- |
| Node | Key | Node | Cost | Prev |
| E | 5 | A | 6 | B |
| A | 6 | B | 3 | O |
| G | 7 | E | 5 | B |
|  |  | G | 3 | O |
|  |  | O | 0 | — |

At this point, the stopping condition fails because there is no connection node and the system picks the destination queue (step 204). In step 206 the system looks for nodes adjacent to the head node on the destination queue. Since the head node is node F, the adjacent nodes are nodes E and D. The cost of traveling from E to F is 2, thus, the cost traveling from E to F to D is 6. In step 208 the system determines that there is not a lower known cost for traveling from E to D so the visited list and priority queue are updated accordingly. The cost of traveling from D to F to D is eight which is more than the cost of zero associated with Node D in the visited list, so the visited lot and priority queue are not updated. In step 206 the system determines that there is not another adjacent node and F is removed from the priority queue in step 212. Table 4 reflects the state of the destination priority queue and visited list at this point in the method.

TABLE 4

| Dest. Priority Queue | | Dest. Visited List | | |
| --- | --- | --- | --- | --- |
| Node | Key | Node | Cost | Next |
| C | 5 | C | 5 | D |
| E | 6 | D | 0 | — |
|  |  | E | 6 | F |
|  |  | F | 4 | D |

In step 214 the system determines whether the stopping condition has been met. At this point there is a connection node. Node E is on the visited list for the origin and the destination. The total cost for node E is 11. That is, the cost from traveling from the origin to node E is 5 and from node E to the destination is 6. The stopping condition is not met because the cost of traveling from the origin to the head node in the origin priority queue (E) is 5 and the cost of traveling from the head node of the destination priority queue C to the destination is also 5. The sum of the two costs is 10 which is lower than the total cost for the connection node which is 11, therefore the stopping condition fails and the system picks the origin priority queue in step 204.

The head node in the origin priority queue is node E, which has two adjacent nodes: C and F. In step 208 the system determines whether a lower cost for traveling from the origin to F is already known. Since F is not on the origin priority queue, there is no known cost and the cost of traveling from the origin to E to P, which is 7, is added to the origin priority queue and the visited list. In step 206 the system determines that there is another adjacent node, C, and in step 208 the system determines whether there is a known cost traveling to C from the origin already known. The cost of traveling from the origin to E to C is 9. Since there is no known lower cost from traveling from the origin to C, C is added to the priority queue and the visited list. At this point there are no more adjacent nodes to node E and node E is removed from the queue (step 212). Table 5 reflects the current state of the origin priority queue at this point in the method.

TABLE 5

| Origin Priority Queue | | Origin Visited List | | |
| --- | --- | --- | --- | --- |
| Node | Key | Cost | Prev | Prev |
| A | 6 | A | 6 | B |
| G | 7 | B | 3 | O |
| F | 7 | C | 9 | E |
| C | 9 | E | 5 | B |
|  |  | F | 7 | E |
|  |  | G | 3 | O |
|  |  | O | 0 | — |

In Step 214 the system determines that the stopping condition has been met. At this point there are three connection nodes. The total cost of connection node C is 14, the total cost of connection node F is 11 and the total cost of connection node E is 11. Since nodes E and F have the lowest total costs of all the connection nodes, nodes E and F are considered the best connection nodes. Various alternatives within the scope of the present invention may utilize other definitions of "best connection node." The cost of traveling from the origin to the head node on the origin priority queue is 6. The cost of traveling from the head node of the destination priority queue to the destination is 5.

Therefore, the cost of traveling to and from the head nodes is eleven, which is equal to the total cost of the best cost connection node, which is also eleven. Thus, the stopping condition is met and the system builds the path in step 216.

The step of building the path is as follows. A rule selects some connection node. One such rule is to choose the best connection node. The selected connection node K is looked up in the origin visited list and the previous node $P_1$ on the path from the origin is found. If $P_1$ is not the origin, then $P_1$ is looked up in the visited list and the previous node $P_2$ is found. This continues until the origin is reached. Suppose the origin is reached as node $P_L$. Similarly, K is looked up in the destination visited list and the next node $N_1$ is found. If $N_1$ is not the destination, then $N_1$ is looked up in the visited list This continues until the destination is reached. Suppose the destination is reached as node $N_M$. At this point the path from the origin to the destination is known: it is the path from $P_L$ (the origin) to $P_{L-1}$, to $P_{L-2}$, . . . , to $P_2$, to $P_1$, to K, to $N_1$, . . . , to $N_{M-1}$, to $N_M$ (the destination).

In the present example, nodes E and F were both the best connection nodes. The system arbitrarily picks node E. Looking at the visited list in Table 5, the best known cost of traveling from the origin to node E involves traveling from node B to node E. Thus, the path being built will travel from B to E. The system then finds node B in the visited list and determines that the best path to node B is directly from the origin O. At this point the path built includes traveling from O to B to E. After the system reaches the origin, the system builds a path from the connection node to the destination. Looking at the visited list in Table 4, the best path from E to the destination involves traveling from E to F. Thus, F is added to the path. The visited list also indicates that the best path from F to D is directly from F to D. Thus, the path built is O-B-E-F-D.

Many automotive navigation systems that perform pathfinding calculations will typically have a means for caching map data. For example, a portion of the DRAM Memory 18 will be dedicated to act as a cache for pathfinding purposes. When the system looks at adjacent nodes in step 206, it needs to access data for that node. The system will first look in the cache portion of DRAM Memory 18. If the node information is found in DRAM Memory 18 the system reads that information and proceeds to carry out the steps in the method. If the data is not found in the cache portion of DRAM Memory 18, then the system will access the electronic map database which may be on a CD-ROM. Other processor readable storage media sufficiently local to the processor can also be used to cache data.

In some systems, the pathfinding computation is speeded up by not considering all nodes to which a head node is connected to. Rather, the exploration is limited to certain neighboring nodes. One such method classifies nodes according to the importance of the roads on which they occur, and progressively restricts the use of neighboring nodes as a distance from the origin (or to the destination) increases. For example, if the cost measure being used is an estimate of driving time, the exploration might not use residential-level roads more than two minutes' driving time from the origin or destination, nor use arterial-level roads more than ten minutes' driving time from the origin or destination, and so on.

The present invention loads data into the cache so that some of the data needed for the pathfinding computation is already in the cache when the computation begins, therefore, saving time accessing the CD-ROM or other storage device during the pathfinding computation. FIG. 5 is a flow chart which explains how the current invention can be used as part of a pathfinding computation. In step 280 a pathfinding exploration is run in the background, that is, using available and otherwise unused computation time of the system's processor. This background process is a modified pathfinding computation which loads the cache with some of the data needed to make a subsequent full pathfinding computation. In one alternative, step 280 can be run as a regular process rather than in the background. In another alternative, step 280 can be a full pathfinding computation. This background process chooses, automatically, an origin in an electronic map without the pathfinding computation being requested and commences a pathfinding calculation based on that origin. The system determines whether the background process should terminate by testing whether a stopping condition is met. The details of the stopping condition will be discussed below with respect to FIG. 6. If the stopping condition is not met, the background process continues. If the stopping condition is met, the system can terminate the background process and wait for a path to be requested by a user, start a new background process without purging the cache, purge the cache and start a new background process, wait a specified amount of time and start a new background process, or perform another suitable alternative. If a user requests a path while the background process is running, the background process 280 will be terminated and the pathfinding calculation will commence (step 286). In alternative embodiments, when there is a request by a user to find a path, the system may allow the background process to finish its course, or the background process can stop and perform a second exploration (described below) prior to commencing the requested pathfinding computation. As described below, background process 280 loads data in the cache so that some of the data needed for pathfinding computation 286 is already in the cache when pathfinding computation 286 begins.

Figure 6:
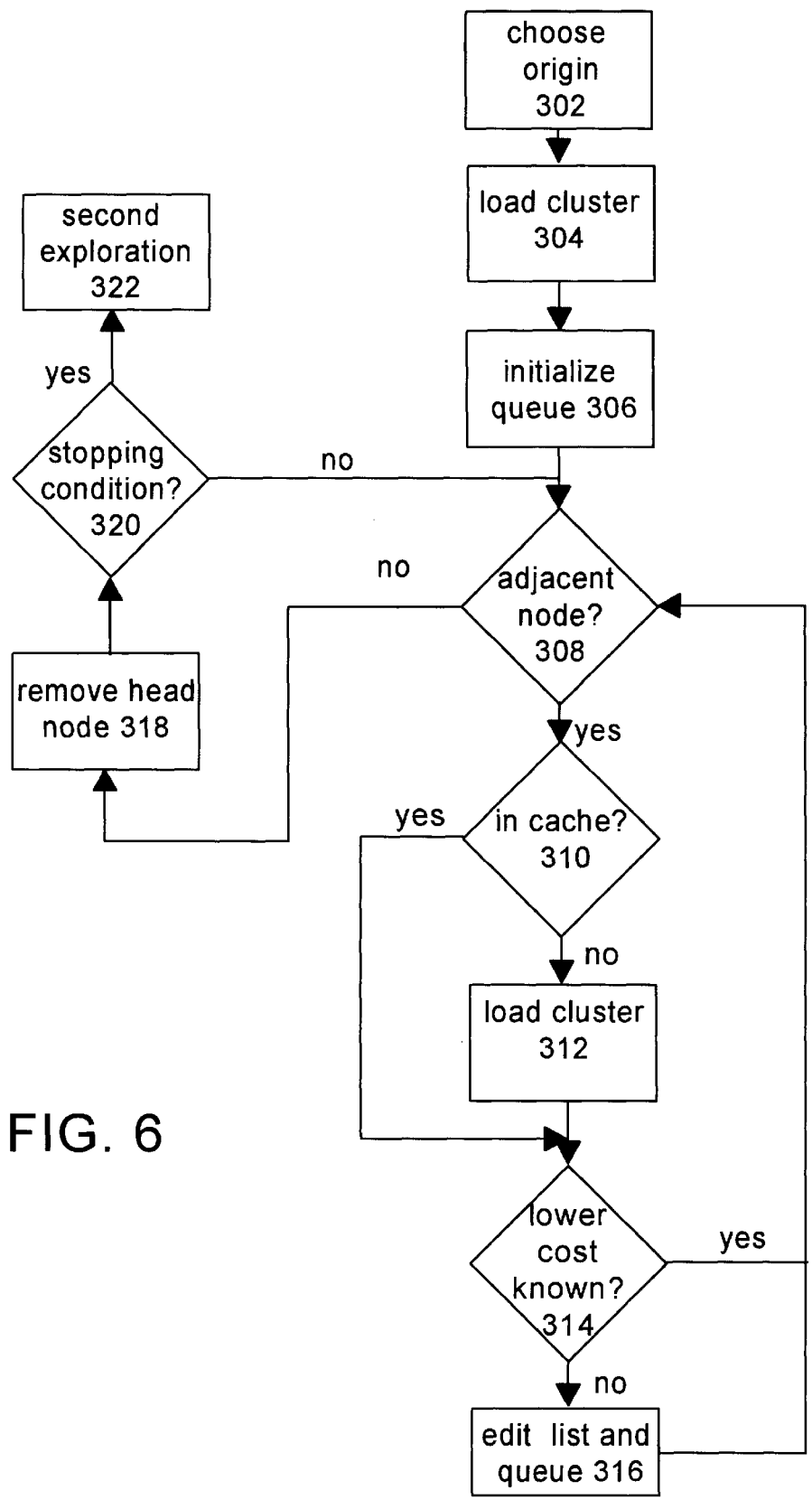
FIG. 6 is a flow chart describing the background process depicted in FIG. 5.

FIG. 6 is a flow chart which describes the background process (step 280). In step 302 the system chooses an origin. Each iteration of the background process consists of exploring outward from an origin, determined by a reference to the current and recent positions of the vehicle. In some applications of the invention, the origin is simply the current position of the vehicle when the background process begins. In other applications, the origin is a position intended to be an estimate of a future position of the vehicle. For example, a system might consider the distance between the current position of the vehicle and the position of the vehicle when the previous background process started, multiply that distance by some constant (for example, 0.5 or 1), extrapolate that distance further down the current road, and use that extrapolated position as the origin of the new exploration. The step of determining or choosing the origin is done automatically without the user requesting that a pathfinding computation begin. Additionally, the origin should be a location in the electronic map. In step 304 the data for the chosen origin is loaded into the cache memory. The present invention will work with data stored in sets of data or data that is not grouped. Various types of "sets of data" are within the scope of the present invention. FIG. 6 assumes (for example purposes only) that a set of data is a cluster of data grouped geographically or by connectivity. In step 306 the origin priority queue and origin visited list are initialized. The background process does not use a destination priority queue and visited list because the destination is unknown.

It is contemplated that in some embodiments, a destination can be estimated and, thus, the destination queue would be set up. The estimated destination can be used to bias the exploration. However, in the preferred embodiment there is no destination known and, thus, no destination priority queue. Since the destination is not known, the key in the priority queue cannot utilize information regarding the destination. Thus, in this example the key for the origin priority queue is the cost of traveling from the origin to the node. In the embodiment where the destination is estimated, the key can reflect an estimated distance to the destination in order to bias the exploration toward the destination.

In step 308, the system determines whether there is an adjacent node. Step 308 is analogous to step 206. If there is more than one adjacent node, the system arbitrarily chooses one of those nodes. The system looks to see if the data for the adjacent node is in the cache (step 310). The data for that node typically includes the following useful for pathfinding: the nodes location, associated links, adjacent nodes, associated costs, etc. If the data for the node is not in the cache, the cluster containing the data for that node is loaded into the cache in step 312. After the cluster is loaded into the cache, or if the data was already in the cache, the system determines whether a lower cost for that particular adjacent node is already known (step 314). Step 314 is analogous to step 208. If there is not a known lower cost, then the visited list and priority queue are edited in step 316, similar to what is performed in step 210. The system loops through steps 308–316 for each adjacent node. When there are no more adjacent nodes, the head node in the priority queue is removed in step 318 and a stopping condition is tested in step 320. In step 314, if there is a lower cost known, then the system loops to step 308.

The stopping condition in step 320 is likely to be different than the stopping condition in step 214. There are many examples of stopping conditions that are suitable for step 320, including stopping when a certain fraction (or percentage) of the cache has been filed, stopping when a predetermined number of sets of data (or clusters or records) have been loaded in the cache, stopping when a predetermined number of nodes have been processed, stopping when the cost of the path from the origin to the node at the head of the priority queue reaches a predetermined threshold, and stopping after a predetermined amount of time. These are only some examples of stopping conditions that are suitable for the current invention and many other stopping conditions can be determined by experimentation and fine-tuning the performance of the entire navigation or pathfinding system. If the stopping condition of step 320 is not met, the system checks adjacent nodes of the current head node and steps 308 to 316 are repeated for each adjacent node to the current head node.

In one embodiment, when the stopping condition of step 320 is met the background process ends. In another embodiment, after the stopping condition is met a second (or reduced) exploration (step 322) is performed. In the second exploration, the background process continues with respect to nodes whose data is already stored in the cache, but ignores nodes whose data is not stored in the cache. That is, the exploration deletes ignored nodes from the queue without otherwise processing them. This second exploration has the effect of marking data as recently used at a very low cost in time since only nodes whose clusters are already in the cache are processed. Data that is marked as recently used is generally not removed from the cache until data that is not marked recently used is removed. The second exploration terminates when the priority queue is empty.

Figure 7:
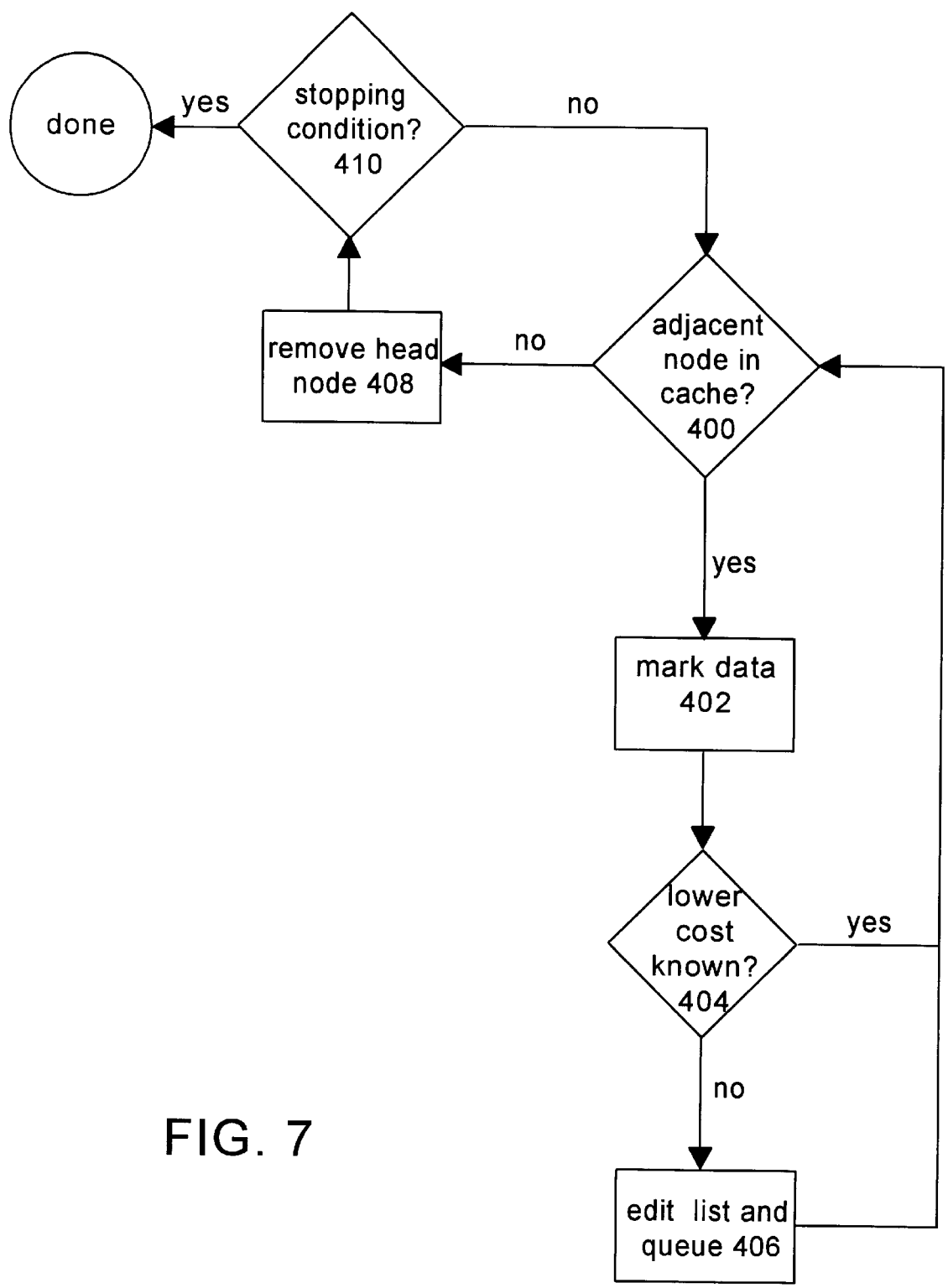
FIG. 7 is a flow chart describing the second exploration depicted in FIG. 6.

FIG. 7 is a flow chart illustrating the second exploration. In step 400, the systems looks to see if there are any adjacent nodes to the current head node for which the data is already in the cache. If so, that data is marked as "recently used" (step 402). In step 404 the system determines whether a lower cost for that particular adjacent node is already known (step 404). Step 404 is analogous to step 314. If there is not a known lower cost, then the visited list and priority queue are edited in step 406, similar to what is performed in step 316. The system loops through steps 400–406 for each adjacent node whose data is in the cache. When there are no more adjacent nodes with data in the cache, the head node in the priority queue is removed in step 408 and a stopping condition is tested in step 410. Step 408 is analogous to step 318. If the stopping condition is met, the method of FIG. 7 is done. If the stopping condition of step 410 is not met, the system loops to step 400. The stopping condition can include stopping after a number of nodes have been processed, after a predetermined amount of time has passed, when the queue is empty or other suitable conditions. One alternative contemplates no stopping condition. That is the second exploration will continue until a user requests that a path be calculated or there are no more nodes to process. At any time during the steps of FIGS. 6 and 7, if a user requests that a path be calculated background process 280 terminates and pathfinding computation 286 begins. When pathfinding computation 286 is performed, some of the data needed to compute the path has already been loaded into the cache during step 280; therefore, the pathfinding computation may use at least some of the data in the cache in lieu of accessing the map database. For example, the data for the origin and/or adjacent nodes may be in the cache so a CD-ROM need not be accessed to perform some of the steps of FIG. 4.

The following discussion illustrates the method described in FIG. 6 using the electronic map (or other network) of FIG. 3. Assume for exemplar purposes that a driver in a car is traveling from G to O when background process 280 commences and the system chooses O as its origin (step 302). The cluster including data for origin O is loaded from a CD-ROM into the cache (step 304) and the queues are initialized (step 306). Origin O has three adjacent nodes: A, B and G (step 308). The system arbitrarily chooses node A and looks to see if the data for node A is in the cache (step 310). As discussed above, a cluster may contain data for more than one node. For exemplar purposes only we will assume that a first cluster includes data for nodes O and G, a second cluster includes data for nodes A, C and D and a third cluster includes data for nodes B, E and F.

The system determines that data for node A is not in the cache (step 310) and, therefore, loads the cluster which includes the data for node A into the cache (step 312). In step 314, the system determines whether there is a lower cost node on the visited list or the priority queue for the adjacent node picked, which in this case is A. Since the exploration has just begun, node A is not on the visited list or the priority queue so there is not a known cost. In step 316, the system edits the visited list and the priority queue to add node A and its cost. The method loops back to step 308 to determine whether there any additional nodes that have not been considered. In this case there are two adjacent nodes that have not been considered: B and G. The system arbitrarily chooses node B for the next iteration of steps 308 through 316.

In step 310 the system determines whether the data for node B is already in the cache. Since the data for node B is in the third cluster which has not been loaded into the cache, in step 312, the system loads the third cluster (data for nodes B, E and F) into the cache. In step 314 the system determines whether there is a lower known cost for node B. Since B does not appear on the priority queue or the visited list there is no lower cost known (step 314), and node B is added to the priority queue and visited list (step 316). The system loops back to step 308 and considers node G. Since the data for node G is in the same cluster as the data for origin O there is no need to load a new cluster in. Because there is no known cost lower than the cost of traveling directly from origin O to G, G is added to the priority queue and visited list. The system loops back to step 308 and determines that there are no more adjacent nodes; therefore, in step 318 the head node, which is currently the origin, is removed from the priority queue. Table 1 (above) reflects the contents of the origin priority queue and the visited list at this point in the exploration.

In step 320 the system determines whether a stopping condition has occurred. Assume for this example only that the stopping condition is met when 6 nodes have been processed. At the present state of the exploration, the stopping condition (step 320) is not met because only four nodes have been processed: G, O, A and B. Since the stopping condition is not met the system loops back to step 308 which looks at the adjacent nodes to the head node, which is currently node B. The adjacent nodes to node B are nodes A and E, and the system arbitrarily chooses node A. The data for node A is already in the cache and so the system skips step 312 and determines whether there is a lower cost known for node A (step 314). Although node A does appear in the visited list with the cost of 9, the cost of traveling from the origin to node A via node B is 6, which is lower than the cost of traveling from origin O directly to node A. Therefore, in step 316 the visited list and priority queue are edited so that the cost of traveling to node A is 6 and B is inserted into the visited list as the previous node for node A.

The system loops back to step 308 and determines that there is another adjacent node, E. The data for node E is in the same cluster as the data for node B, which is already loaded into the cache; therefore, step 312 is skipped. In step 314, the system determines that there is not a lower cost known for node E and the priority queue and visited list are edited to include node E (step 316). Node B is then removed from the priority queue (step 318). Table 3 (above) reflects the current state of the origin priority queue and the visited list after node B is removed from the priority queue. At this point, the stopping condition fails because only 5 nodes have been processed and the stopping condition requires that 6 nodes be processed.

The system loops back to step 308 and determines that the head node on the origin priority queue, node E, has two adjacent nodes: C and F. The system arbitrarily chooses node F, whose data has already loaded into the cache. Since F is not on the origin priority queue, there cannot be a lower known cost (step 314). The cost of traveling from the origin to F via E, which is 7, is added to the origin priority queue and the visited list (step 316). In step 308 the system determines that there is another adjacent node, C, whose data has already been loaded into the cache (second cluster). The system determines that a lower cost is not known for traveling from the origin to C (step 314) and C is added to the priority queue and the visited list (step 316). At this point there are no more adjacent nodes (step 308) and node E is removed from the queue (step 318). Table 5 reflects the current state of the origin priority queue and the visited list at this point in the exploration.

In step 320 the system determines that the stopping condition has been met. The stopping condition requires that at least 6 nodes have been processed and the system determines that 7 nodes have been processed. Since the stopping condition has been met the background process is over. As discussed above, one alternative includes beginning a second exploration (step 322) after the stopping condition is met. The second exploration of step 322 continues the exploration for only those nodes whose data is already in the cache. In the current example, the nodes with data in the cache include nodes G, O, A, C, D, B, E and F. The inventors contemplate that background process 280 can be implemented with or without the second exploration. After the background process is terminated, it is possible that a pathfinding computation will commence. If, for example, the pathfinding computation is computing a path from O to D, then when considering nodes G, O, A, C, D, BY E and F in steps 202–216, the system will read the data from the cache without having to access the map database.

Although the examples used above to describe the present invention were directed to an electronic map of roads, the present invention also applies to other processor readable representations of networks. A network is defined in its most general sense as something that includes a number of paths that interconnect or branch out. Many systems that involve decisions can be modeled as a network. A network can be represented in electronic form (or other processor readable form) and stored on a processor readable storage medium so that software can be created for using the network. Suitable networks include graphs of a manufacturing process, intermodal travel plan (e.g., a graph representing travel between points via airplanes, trains, automobiles, buses, etc.), a system for providing medical treatment, etc. For example, if the network represents a manufacturing process, the nodes may represent decision points in the process (e.g. which station to transport the article of manufacture or which semiconductor process to use), and the links can represent process time or manufacturing costs.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for loading data into a processor readable storage medium, comprising the steps of:

choosing, automatically, a first origin in a processor readable representation of a network;

commencing a pathfinding exploration using a processor, said pathfinding exploration explores from said first origin, said steps of choosing and commencing being performed without a pathfinding computation being requested;

loading sets of data, as needed by said pathfinding exploration, into said processor readable storage medium;

terminating said pathfinding exploration when a predefined condition is met;

receiving a request to compute a path from a new origin and a new destination;

storing an indication of said new origin and an indication of said new destination; and computing a path from said new origin to said new destination using at least a subset of said loaded data, said step of computing a path being performed after said step of commencing.

2. A method according to claim 1, further including the steps of:

choosing, automatically, a second origin in said processor readable representation of a network without said path-finding computation being requested;

commencing a second pathfinding exploration using said processor, said second pathfinding exploration explores from said second origin;

loading new sets of data, as needed by said second pathfinding exploration, into said processor readable storage medium; and terminating said second pathfinding exploration when said predefined condition is met.

3. A method according to claim 1, wherein:
said predefined condition is met when a path is requested.

4. A method according to claim 1, wherein:
said steps of choosing, commencing, loading and terminating are performed as a background process.

5. A method according to claim 1, wherein:
said data is stored on a CD-ROM; and
said step of loading loads said data from said CD-ROM into a cache memory.

6. A method according to claim 1, wherein:
said steps of choosing and commencing are performed without storing an indication of a destination.

7. A method according to claim 1, wherein:
said processor readable representation of a network is an electronic map;
said electronic map includes a plurality of nodes, each node having at least one cost for traveling to or from an adjacent node; and
said step of commencing a pathfinding exploration includes:
(a) setting up a priority queue and a visited list, said priority queue stores node identifications and keys, said visited list stores node identifications and costs of traveling from said origin;
(b) initializing said priority queue to include said origin;
(c) finding a set of nodes adjacent to said origin;
(d) determining a cost of traveling to each of said adjacent nodes from said origin;
(e) inserting said adjacent nodes into said priority queue, sorted by cost;
(f) inserting said adjacent nodes into said visited list;
(g) removing said origin from said priority queue;
(h) finding a set of nodes adjacent to a node at said priority queue's head;
(i) determining a cost of traveling to each of said nodes adjacent to said node at said priority queue's head;
(j) inserting into said priority queue at least a subset of said nodes adjacent to said node at said priority queue's head;
(k) inserting into said visited list, if not already in said visited list with a lower cost, said nodes adjacent to said node at said priority queue's head; and
(l) removing from said priority queue said node at said priority queue's head.

8. A method according to claim 7 wherein:
said key includes a cost of traveling from said origin and said key does not include any information about a destination.

9. A method according to claim 7, wherein:
said predefined condition is met when a cost for traveling from said origin to said node at said priority queue's head reaches a predetermined threshold.

10. A method according to claim 1, wherein:
said processor readable representation of a network is an electronic map.

11. A method according to claim 10, wherein:
said step of choosing a first origin chooses a current position of a vehicle.

12. A method according to claim 10, wherein:
said step of choosing a first origin chooses a position in said electronic map that is a distance from a current position.

13. A method according to claim 10, wherein:
said sets of data are loaded into a cache memory in said processor readable storage medium.

14. A method according to claim 13, wherein:
said processor readable storage medium is memory; and
said cache memory is a portion of said memory.

15. A method according to claim 13, further including the step of:
determining when a predetermined percentage of said cache memory is filled, said predefined condition is met when said predetermined percentage of said cache memory is filled.

16. A method according to claim 13, further including the step of:
determining when a predetermined number of nodes have been processed, said predefined condition is met when said predetermined number of nodes have been processed.

17. A method according to claim 13, further including the step of:
performing a second exploration, said second exploration only considers data residing in said cache memory when said second exploration commences, data used by said second exploration is marked as being recently used.

18. A method according to claim 13, further including the step of:
continuing said pathfinding exploration utilizing data in said cache memory and not loading any additional data into said cache memory.

19. A method according to claim 9, wherein:
said step of continuing is performed after said step of terminating said pathfinding exploration when a predefined condition is met.

20. A method for computing a path in an electronic representation of a network, comprising the steps of:
running a background process for loading network data from a mass storage device into a memory, said background process includes an exploration of said network from a chosen origin and loading data needed by said exploration;
terminating said background process when a stopping condition is met or when a pathfinding calculation is requested;
storing a first origin and a first destination; and
determining a path from said first origin to said first destination, after terminating said background process, using said network data loaded into said memory.

21. A method according to claim 20, wherein:
said background process loads data from a CD-ROM to a cache.

22. A method according to claim 19, wherein:

said steps of running and terminating are continuously repeated until said step of performing a pathfinding calculation is commenced.

23. An apparatus for pathfinding, comprising:

a processor;

a memory, in communication with said processor; and a processor readable storage medium; in communication with said processor and said memory;

said processor programmed to perform the method of:

choosing, automatically, a first origin in an electronic map;

commencing a pathfinding exploration, said pathfinding exploration explores from said first origin, said steps of choosing and commencing being performed without a pathfinding computation being requested;

loading sets of data, as needed by said pathfinding exploration, from said processor readable storage medium into a cache portion of said memory;

terminating said pathfinding exploration when a predefined condition is met;

receiving a request to compute a path from a new origin and a new destination, storing an indication of said new origin and an indication of said new destination, and computing a path from said new origin to said new destination using at least a subset of said data loaded in said cache portion of said memory, said step of computing being performed after said step of terminating.

24. An apparatus according to claim 23, wherein:

said step of choosing includes said processor choosing a position in said electronic map that is a distance from a current position of a vehicle.

25. An apparatus according to claim 23, wherein said method further includes the step of:

determining when a predetermined amount of data is loaded in said memory said predefined condition is met when said predetermined amount of data is loaded in said memory.

26. An apparatus according to claim 23, wherein is said method further includes the steps of:

choosing, automatically, a new origin in said electronic map without said pathfinding computation being requested;

commencing a second pathfinding exploration using said processor;

loading new sets of data, as needed by said second pathfinding exploration, from said processor readable storage medium into said cache portion of said memory; and terminating said second pathfinding exploration when said predefined condition is met.

27. A method for loading data for pathfinding, comprising the steps of:

choosing, automatically, a first origin in an electronic map;

commencing a pathfinding exploration using a processor, said pathfinding exploration explores from said first origin, said steps of choosing and commencing being performed without a destination being indicated;

loading data, as needed by said pathfinding exploration, into a cache memory;

terminating said pathfinding exploration when a predefined condition is met;

storing a new origin and a new destination; and computing a path from said new origin to said new destination using at least a subset of said data loaded in said cache memory, said step of computing being performed after said step of commencing.

28. A processor readable storage medium, said processor readable storage medium having processor readable program code embodied on said processor readable storage medium, said processor readable program code for programming a processor to perform a method comprising the steps of:

choosing, automatically, a first origin in an electronic map;

commencing a pathfinding exploration using a processor, said pathfinding exploration explores from said first origin, said steps of choosing and commencing being performed without a pathfinding computation being requested;

loading data, as needed by said pathfinding exploration, into said processor readable storage medium;

terminating said pathfinding exploration when a predefined condition is met;

receiving a request to compute a path from a new origin and a new destination storing an indication of said new origin and an indication of said new destination; and computing a path from said new origin to said new destination using at least a subset of said loaded data, said step of computing being performed after said step of commencing.

29. A processor readable storage medium according to claim 28, wherein:

said data is loaded into a cache memory; and said cache memory is a portion of main memory.

30. A processor readable storage medium according to claim 28, wherein said method further includes the step of:

determining when a predetermined percentage of said processor readable storage medium is filled, said predefined condition is met when said predetermined percentage of said processor readable storage medium is filled.

31. A processor readable storage medium according to claim 28, wherein:

said data is stored in a CD-ROM; and said step of loading loads said data from said CD-ROM into a cache memory.

32. A processor readable storage medium according to claim 28, wherein:

said steps of choosing and commencing are performed without storing an indication of a destination.

33. A processor readable storage medium according to claim 28, wherein said method further includes the step of:

performing a second exploration, said second exploration only considers data residing in said processor readable storage medium when said second exploration commences, data used by said second exploration is marked as being recently used.

34. A processor readable storage medium according to claim 28, wherein:

said steps of choosing, commencing, loading and terminating are performed as a background process.

* * * * *